US007158377B2

(12) United States Patent
Mecca et al.

(10) Patent No.: US 7,158,377 B2
(45) Date of Patent: Jan. 2, 2007

(54) VEHICLE MULTIMEDIA SYSTEM HAVING A SAFETY INTERLOCK MECHANISM

(75) Inventors: John Mecca, Oakland Township, MI (US); George J. DeHelian, Jr., Roseville, MI (US); Terrence Dale Prestel, Livonia, MI (US); Robert John Burnham, Novi, MI (US); Dana T. Sims, Livonia, MI (US)

(73) Assignee: Visteon Golbal Technologies, Inc., Van Buren Township, MI (US)

( * ) Notice: Subject to any disclaimer, the term of this patent is extended or adjusted under 35 U.S.C. 154(b) by 280 days.

(21) Appl. No.: 10/969,263

(22) Filed: Oct. 20, 2004

(65) Prior Publication Data

US 2006/0082961 A1    Apr. 20, 2006

(51) Int. Cl.
*G06F 1/16* (2006.01)
(52) U.S. Cl. ........................... 361/686; 361/679
(58) Field of Classification Search ................ 361/679, 361/686
See application file for complete search history.

(56) References Cited

U.S. PATENT DOCUMENTS

| 4,843,477 | A | | 6/1989 | Mizutani et al. |
| 5,173,686 | A | | 12/1992 | Fujihara |
| 5,288,049 | A | | 2/1994 | Hays |
| 5,401,089 | A | | 3/1995 | Inagaki et al. |
| 5,743,487 | A | | 4/1998 | Rice |
| 5,822,023 | A | * | 10/1998 | Suman et al. ............... 348/837 |
| 5,847,685 | A | | 12/1998 | Otsuki |
| 5,946,055 | A | * | 8/1999 | Rosen ......................... 348/837 |
| 6,246,449 | B1 | | 6/2001 | Rosen |
| 6,292,236 | B1 | | 9/2001 | Rosen |
| 6,343,863 | B1 | | 2/2002 | Wood |
| 6,352,226 | B1 | | 3/2002 | Gordon |
| 6,364,390 | B1 | | 4/2002 | Finneman |
| 6,366,451 | B1 | | 4/2002 | Smock et al. |
| 6,373,536 | B1 | | 4/2002 | Mell et al. |
| 6,424,386 | B1 | | 7/2002 | Shimizu |
| 6,443,574 | B1 | | 9/2002 | Howell et al. |
| 6,446,925 | B1 | | 9/2002 | Wada |
| 6,476,879 | B1 | * | 11/2002 | Ho et al. .................... 348/837 |
| 6,522,368 | B1 | | 2/2003 | Tuccinardi et al. |
| 6,530,547 | B1 | | 3/2003 | Wada |
| 2003/0137584 | A1 | | 7/2003 | Norvell et al. |
| 2003/0213884 | A1 | | 11/2003 | Ikunami |
| 2004/0084920 | A1 | | 5/2004 | Trimble et al. |
| 2005/0116943 | A1 | * | 6/2005 | Wohrle et al. .............. 345/211 |

FOREIGN PATENT DOCUMENTS

| EP | 1 510 406 A1 | 3/2005 |
| JP | 62046735 | 2/1987 |
| WO | WO 00/38951 | 7/2000 |

\* cited by examiner

*Primary Examiner*—Yean-Hsi Chang
(74) *Attorney, Agent, or Firm*—Brinks Hofer Gilson & Lione

(57) ABSTRACT

A vehicle multimedia system having a safety interlock mechanism. The vehicle multimedia system comprising a portable multimedia unit having a support sensor for sensing support thereon and a docking station configured to interlock the portable multimedia unit therein. The docking station comprises a main frame having a receiving port to receive the portable multimedia unit. The main frame includes a locking assembly for securing the portable multimedia unit to the main frame and a microprocessor for communicating with the locking assembly and the support sensor.

20 Claims, 8 Drawing Sheets

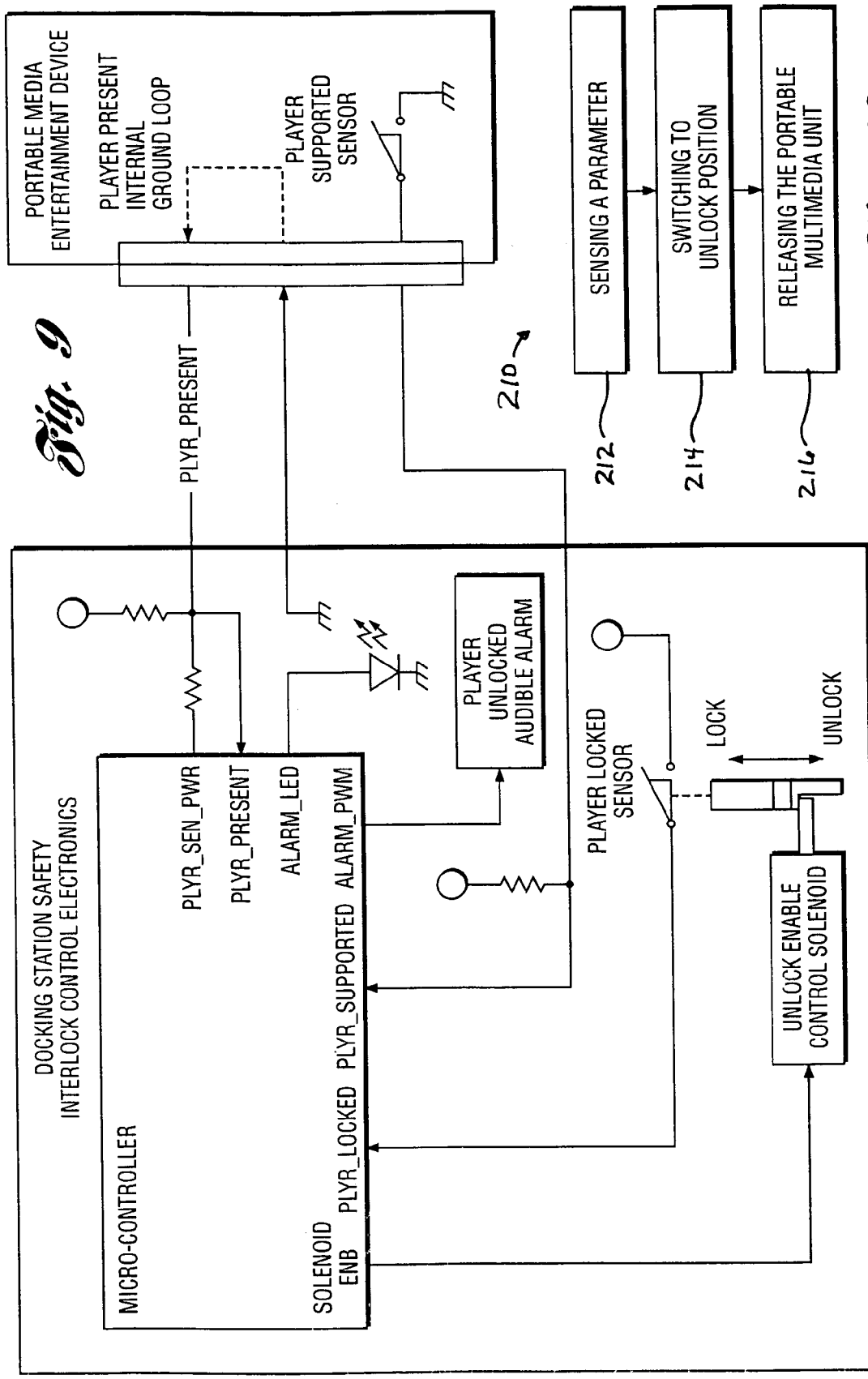

VEHICLE MULTIMEDIA SYSTEM HAVING A SAFETY INTERLOCK MECHANISM

BACKGROUND OF THE INVENTION

The present invention relates to vehicle multimedia systems having safety interlock mechanisms for portable multimedia units.

Multimedia or entertainment systems are being used in vehicles more commonly. There are several current in-vehicle entertainment systems or multimedia systems available from automotive original equipment manufacturers (OEM) or aftermarket providers. Some vehicle multimedia systems provide a portable multimedia unit which may be attached to a docking station in a vehicle and removed therefrom after use. However, such systems do not allow for safe removal and easy portability of the portable multimedia unit.

Current in-vehicle multimedia systems are adequate, but can be improved. For example, many multimedia systems are absent a safety feature when transferring the respective multimedia unit to and from the in-vehicle system. Some vehicle multimedia systems allow for removal of the portable multimedia unit at anytime during use of the system or vehicle. In one example, a multimedia unit is attached to part of the multimedia system at the headliner, wherein the multimedia unit is held by latches. However, such latches may be disengaged from the multimedia unit at any time during the use of the vehicle. In another example, such systems are absent accountability for inadvertent releases and times of undesired removals of the portable multimedia unit, e.g., at high vehicle speeds. This is undesirable.

BRIEF SUMMARY OF THE INVENTION

The present invention generally provides a safety interlock feature to a vehicle multimedia system. The present invention solves the concerns of inadvertent release of a portable multimedia unit for a docking station of the system. The present invention also answers the concerns of undesirable removal of the portable multimedia unit during certain times, e.g., during operation of the vehicle or when vehicle is not powered.

In one embodiment, the present invention provides a vehicle multimedia system having a safety interlock mechanism. The system comprises a portable multimedia unit having a support sensor for sensing support thereon. The system further comprises a docking station configured to interlock the portable multimedia unit therein. The docking station comprises a main frame having a receiving port to receive the portable multimedia unit. The main frame includes a locking assembly for securing the portable multimedia unit to the main frame and a microprocessor for communicating the locking assembly and the support sensor.

In another embodiment, the multimedia system further includes a slide member slidably attached to the main frame and has a latching end cooperable with the portable multimedia unit to lock the portable multimedia unit to the docking station. The slide member has a button end for sliding the slide member relative to the main frame. The slide member has a notch formed therealong. The multimedia system further comprises a solenoid valve having a moveable stem cooperable with the notch of the slide member to define a lock position and an unlock position. The solenoid valve is an electrical communication with the microprocessor to move the stem based on the support sensed by the support sensor.

In yet another example, the present invention provides a method of interlocking a portable multimedia unit to a docking station in a vehicle. The method comprises sensing a perimeter -indicative of support of the portable multimedia unit. The method further comprises switching the portable multimedia unit to an unlock position from a locked position in the docking station so that the portable multimedia unit can be removed from the docking station, if the perimeter indicative of support reaches a predetermined threshold. The method further comprises releasing the portable multimedia unit from the docking station.

Further objects, features, and advantages of the present invention will become apparent from consideration of the following description and the appended claims when taken in connection with the accompanying drawings.

BRIEF DESCRIPTION OF THE DRAWINGS

FIG. 9 is a block diagram of a safety interlock mechanism of the vehicle multimedia system in accordance with one embodiment of the present invention; and FIG. 10 is a flow chart depicting one method of interlocking a portable multimedia unit to a docking station in a vehicle in accordance with one embodiment of the present invention.

DETAILED DESCRIPTION OF THE INVENTION

The present invention generally provides an in-vehicle multimedia system having a safety interlocking mechanism for a portable multimedia unit of the system. The present invention generally solves the concerns of inadvertent release of the portable multimedia unit from a docking station of the system. The present invention essentially restricts removal or release of the portable multimedia unit from the docking station when it may be potentially unsafe to release the portable multimedia unit from the system. This is accomplished by sensing whether there is support, e.g., pressure, on the portable multimedia unit at the time when an attempt (desired or inadvertent) to remove the portable unit occurs. The safety interlock mechanism is a feature that avoids an inadvertent release of the portable multimedia unit from the system or a desired attempt to remove the portable unit when it may be potentially unsafe.

Figure 1:
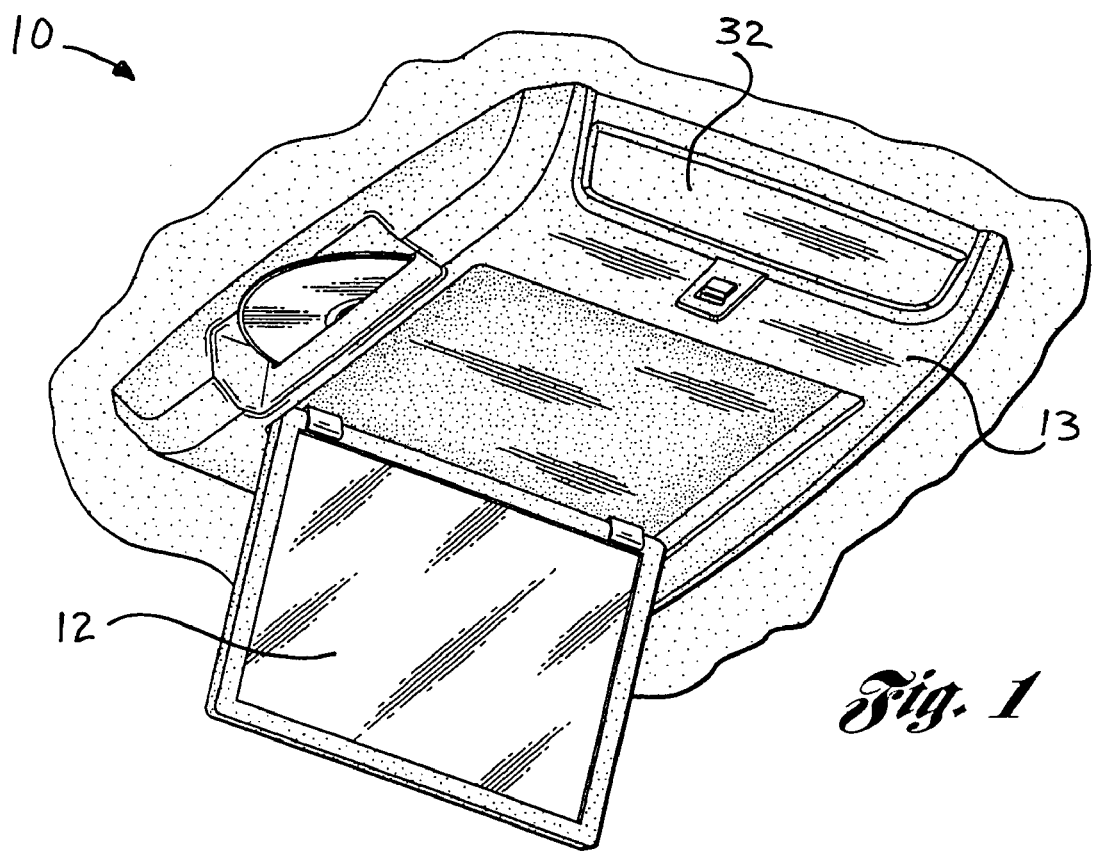
FIG. 1 is an environmental view of a multimedia system in accordance with one embodiment of the present invention.
Figure 2:
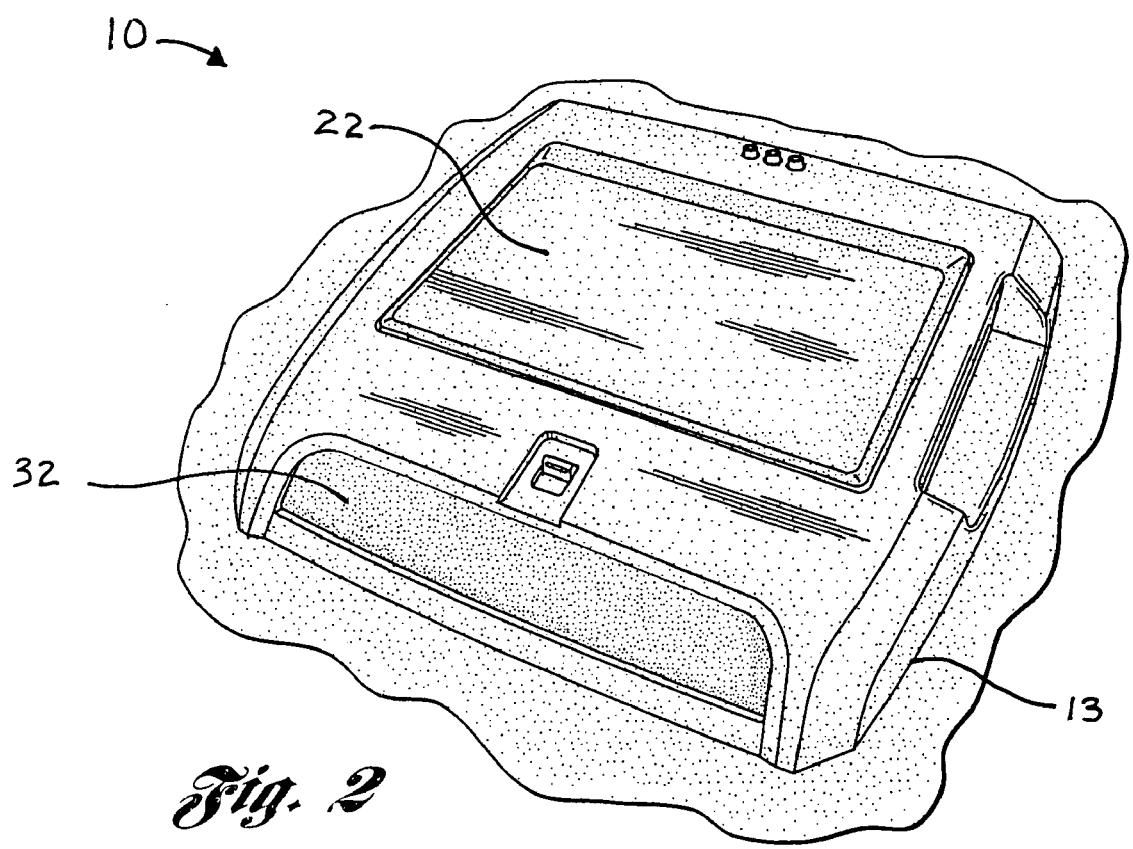
FIG. 2 is a perspective view of the multimedia system shown in FIG. 1.

FIGS. 1 and 2 illustrate a vehicle multimedia system 10 having a safety interlock mechanism in accordance with one embodiment of the present. As shown, the vehicle multimedia system 10 is preferably attached within an interior panel or headliner of a vehicle. In this embodiment, the multimedia system 10 is attached to the headliner 11 of the vehicle. Preferably, the multimedia system 10 comprises a portable multimedia unit 12 and a docking station 13 configured to interlock the portable multimedia unit 12 therein. In this embodiment, the portable multimedia unit 12 is a digital video disc (DVD) player/recorder. However, the portable multimedia unit 12 may be any other suitable portable multimedia/entertainment unit, e.g., a compact disc player or a video game unit.

Preferably, the portable multimedia unit 12 has a support sensor (see FIG. 9) for sensing support thereon when engaged within the docking station 13. As described in greater detail below, the vehicle multimedia system 10 is able to sense and determine support pressure on the portable multimedia unit 12, e.g., a user's hand placed thereon, such that safe removal of the portable multimedia unit 12 may occur and inadvertent or undesirable release of the unit may be avoided.

In this embodiment, the support sensor is a pressure sensor configured to sense support pressure on the portable multimedia unit 12 when the portable multimedia unit 12 is docked in the docking station 13. However, it is to be understood that any other suitable sensor may be used to sense support, e.g., a biometrical sensor, without falling beyond the scope or spirit of the present invention. In this embodiment, the support sensor is configured to sense a support pressure of between about 2 and 4 pounds per square inch (psi), and more preferably about 3 psi pressure placed on the portable multimedia unit 12.

Figure 3:
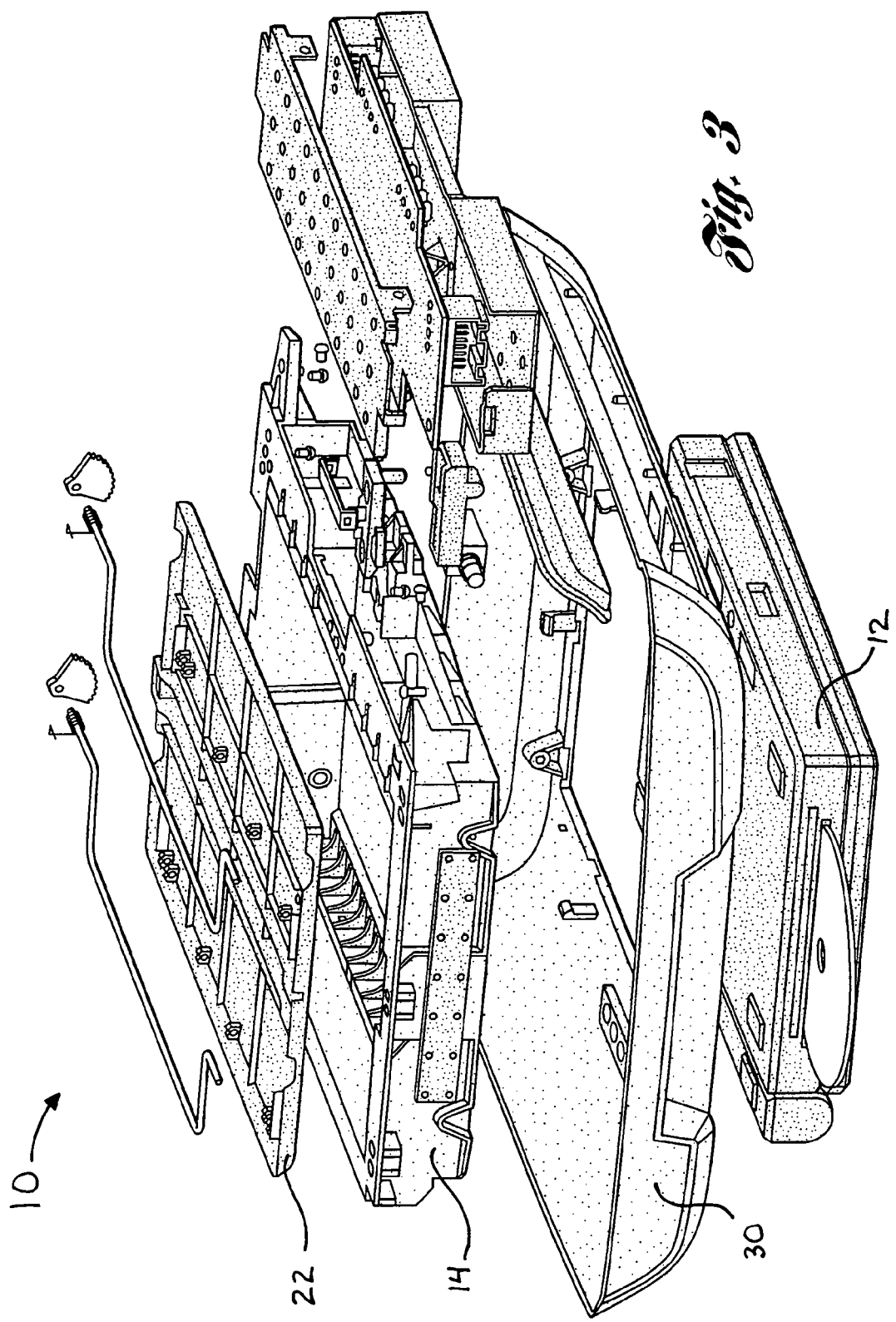
FIG. 3 is an exploded view of the multimedia system in FIG. 2.

FIG. 3 depicts the docking station 13 comprising a main frame 14. In this embodiment, the main frame 14 includes four side members 16 connected adjacent each of the ends to form a receiving port 20. Preferably, the main frame 14 is configured to receive and secure the portable multimedia unit 12. As described in greater detail below, the main frame 14 is configured to receive, secure, and release the portable multimedia unit 12 at the receiving port 20 during use of the unit.

Figure 4:
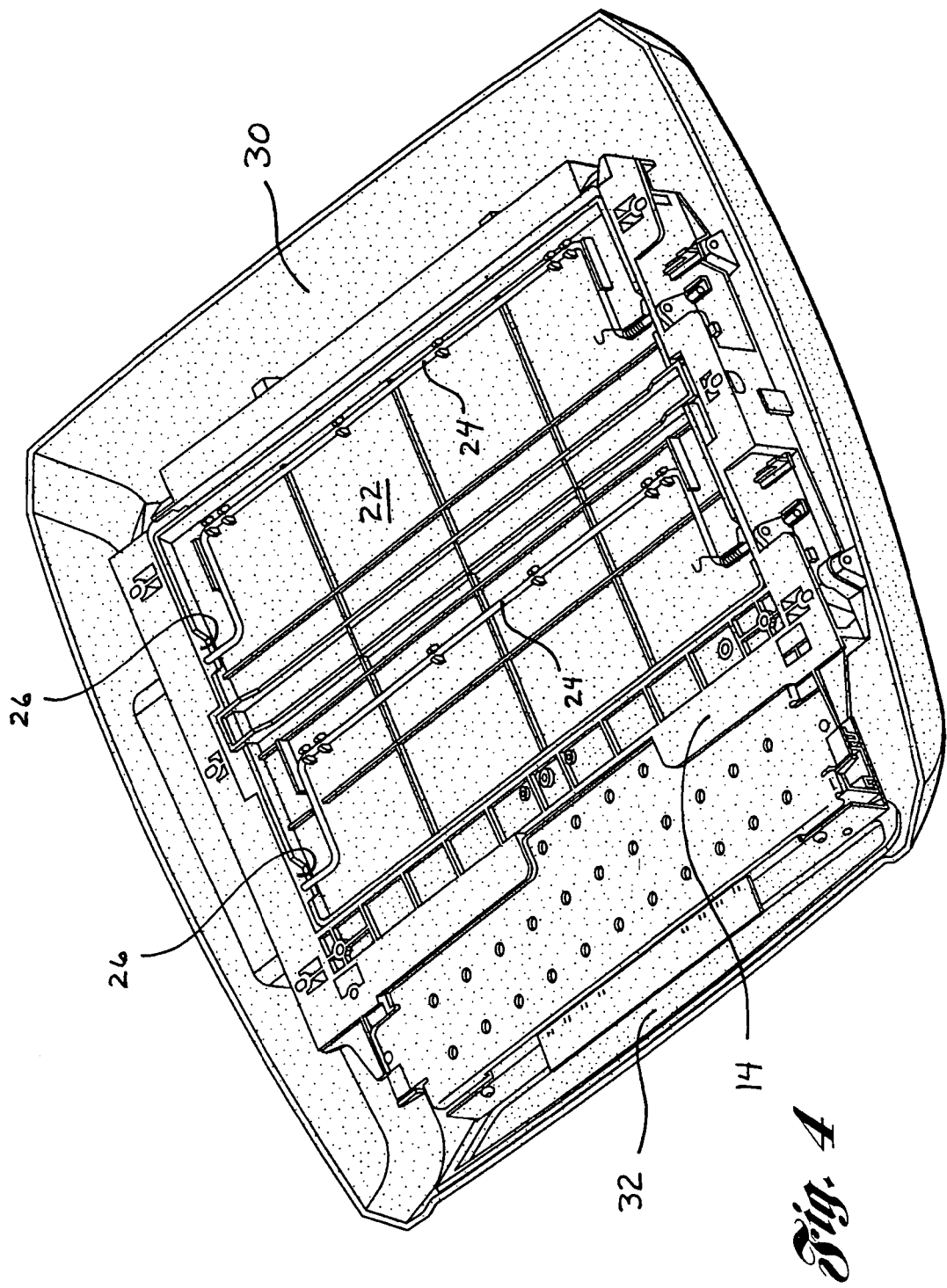
FIG. 4 is a side view of a docking station of the multimedia unit in FIG. 2.

FIGS. 3 and 4 depict the multimedia system 10 further including a moveable floor pivotally connected, by any suitable means, to the docking station 13 at the receiving port 20. In this embodiment, the movable floor 22 is spring loaded to the main frame 14 for receiving the portable multimedia unit 12. As shown, the movable floor 22 includes pivot rods 24 attached to the inner sides 26 of the main frame 14. Preferably, each pivot rod is configured to be spring loaded away form the main frame 14 thereby occupying space otherwise taken by the portable multimedia unit 12 when attached to the docking station 13. Moreover, each pivot rod has dampers 27 attached at one of the ends to dampen pivot movement of the movable floor 22 from the main frame 14 when the portable multimedia unit 12 is removed from the docking station 13.

As shown in FIGS. 1–4, the multimedia system 10 further comprises a cover 30 attached to the docking station 13 to cover 30 the main frame 14. The cover 30 provides protection to the docking station 13 from external wear and adds an aesthetic look to the multimedia system 10. Preferably, the cover 30 includes an infrared (IR) or a radio frequency (RF) window 32 to allow IR or RF signals therethrough for wireless capabilities of the multimedia system 10. In this embodiment, the spring loaded movable floor 22 is configured to be aligned with the outer surface of the cover 30 when the portable multimedia unit 12 is absent from the multimedia system 10.

As shown in FIGS. 3–6, the main frame 14 includes a locking assembly 34 for securing the portable multimedia unit 12 to the main frame 14 and a microprocessor 36 for communicating with the locking assembly 34 and the support sensor. Preferably, the microprocessor 36 is defined by a printed circuit board, but may be any other suitable processor. In this embodiment, the microprocessor 36 is attached to one of the side members 16 of the main frame 14. The microprocessor 36 is configured to receive a signal from the support sensor and to selectively unlock the locking assembly 34 to enable the release of the portable multimedia unit 12 from the vehicle multimedia system 10.

In this embodiment, the locking assembly 34 includes a slide member 40 that is slidably attached to the main frame 14 and a solenoid valve 42 cooperable with the slide member 40. As shown, the slide member 40 has a latching end 44 that is cooperable and engages with the portable multimedia unit 12 in slot to secure and lock the portable multimedia unit 12 to the docking station 13.

Figure 5:
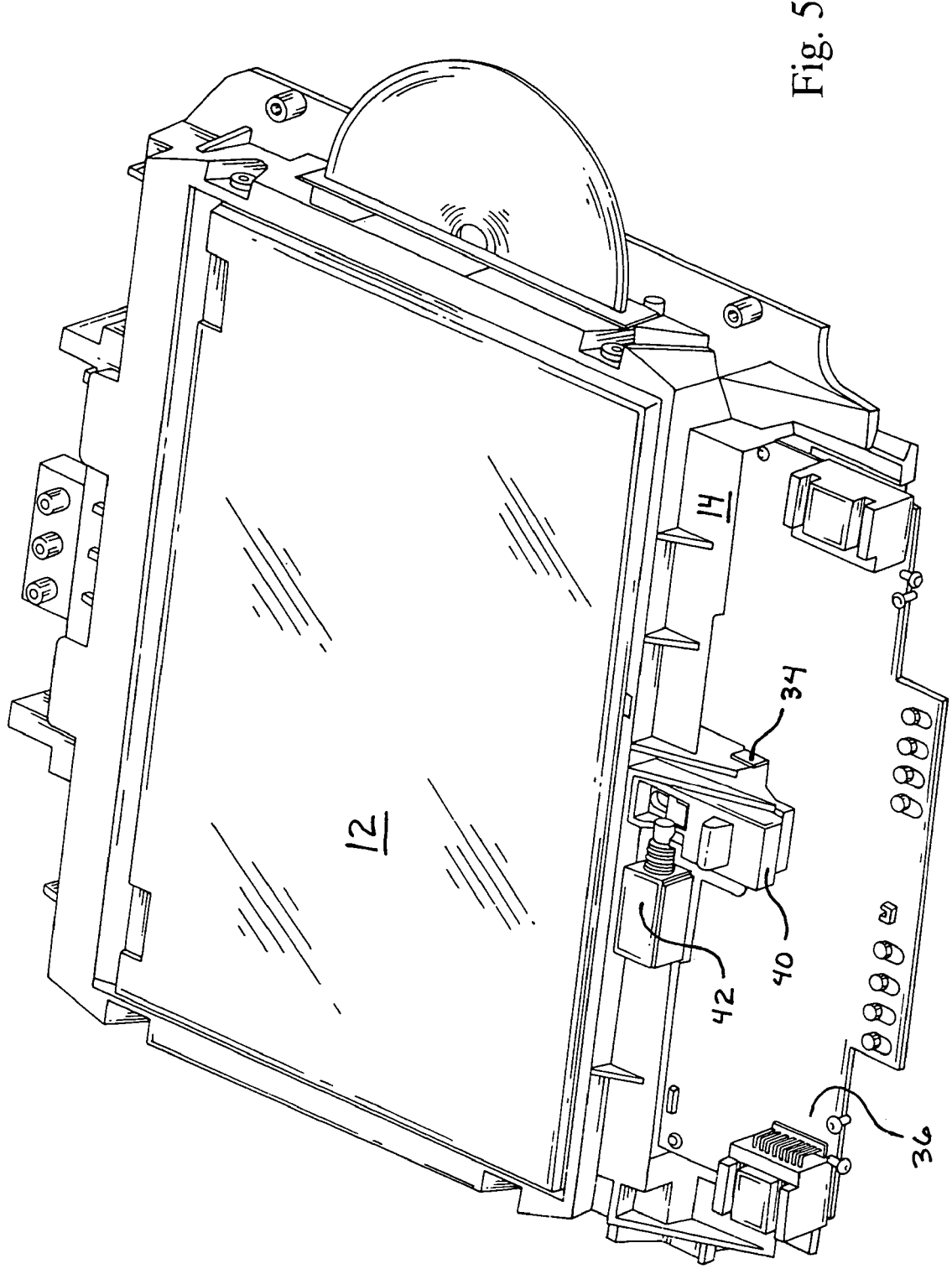
FIG. 5 is a breakaway view of the docking station and a portable multimedia unit in accordance with one embodiment of the present invention.
Figure 6:
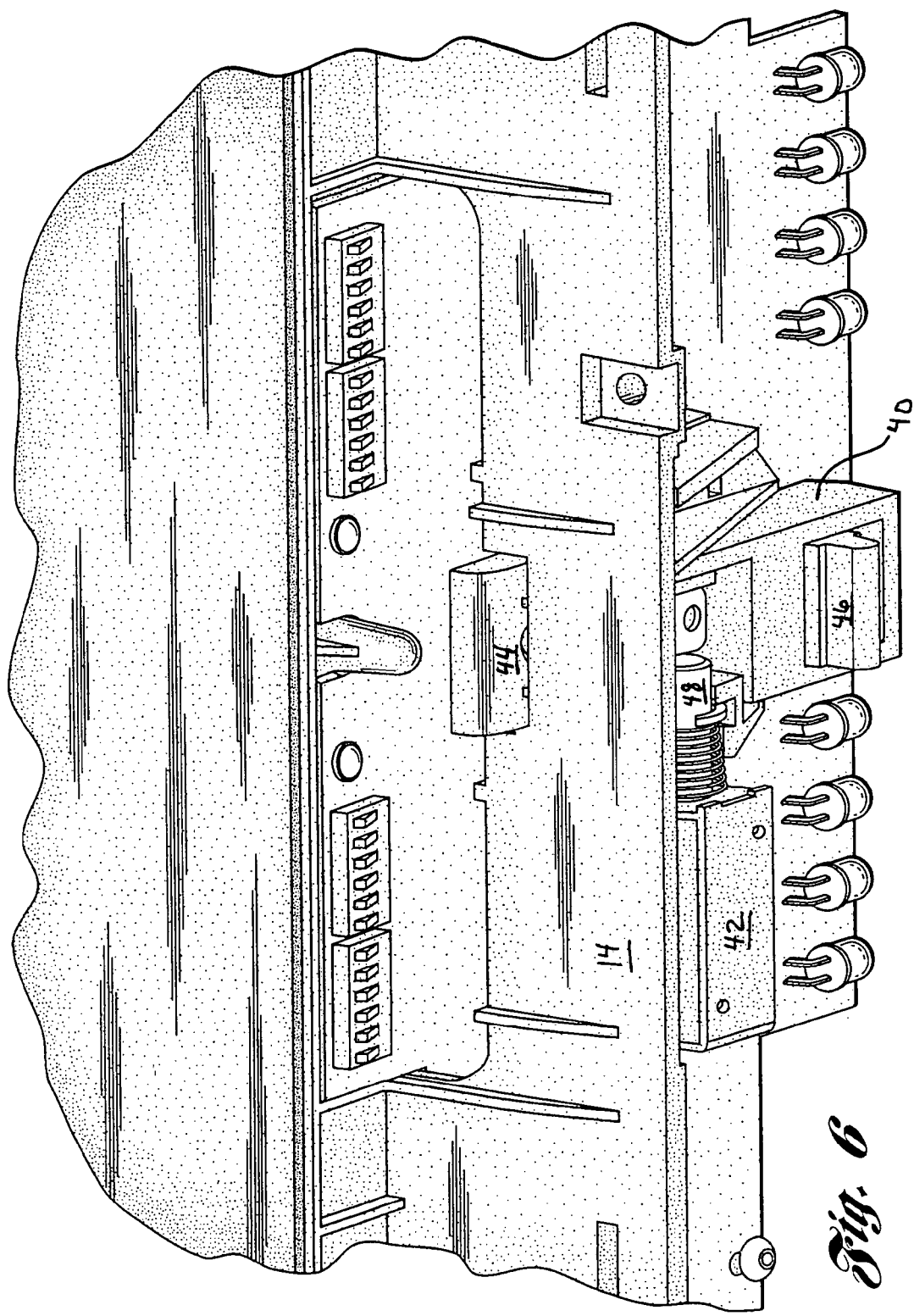
FIG. 6 is a partial side view of the docking station depicting a latching assembly thereof in accordance with one embodiment of the present invention.

As shown in FIGS. 3 and 5, the slide member 40 has a button end to facilitate the user in sliding the slide member 40 relatively toward and away from the main frame 14. As shown in FIG. 5, the slide member 40 further has a notch 47 formed therealong and cooperates with the solenoid valve 42 to enable release of the portable multimedia unit 12 from the system as described below.

Figure 7A:
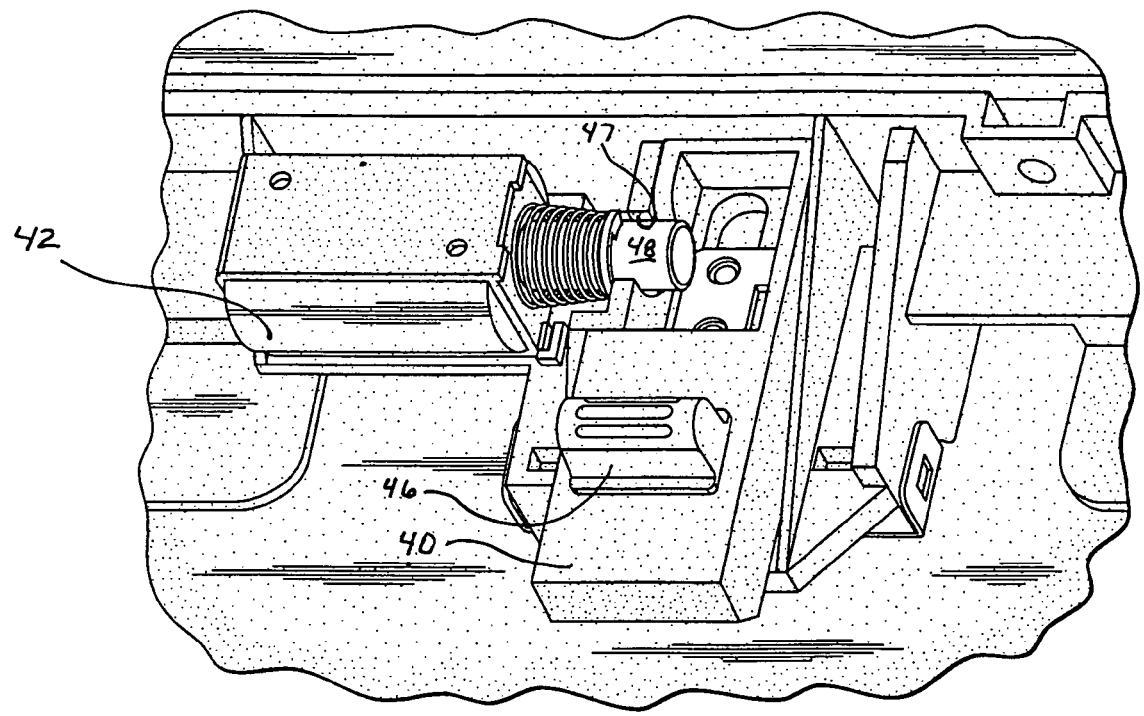
FIG. 7a is a partial side view of the docking station depicting a locking mechanism in a locked position.
Figure 7B:
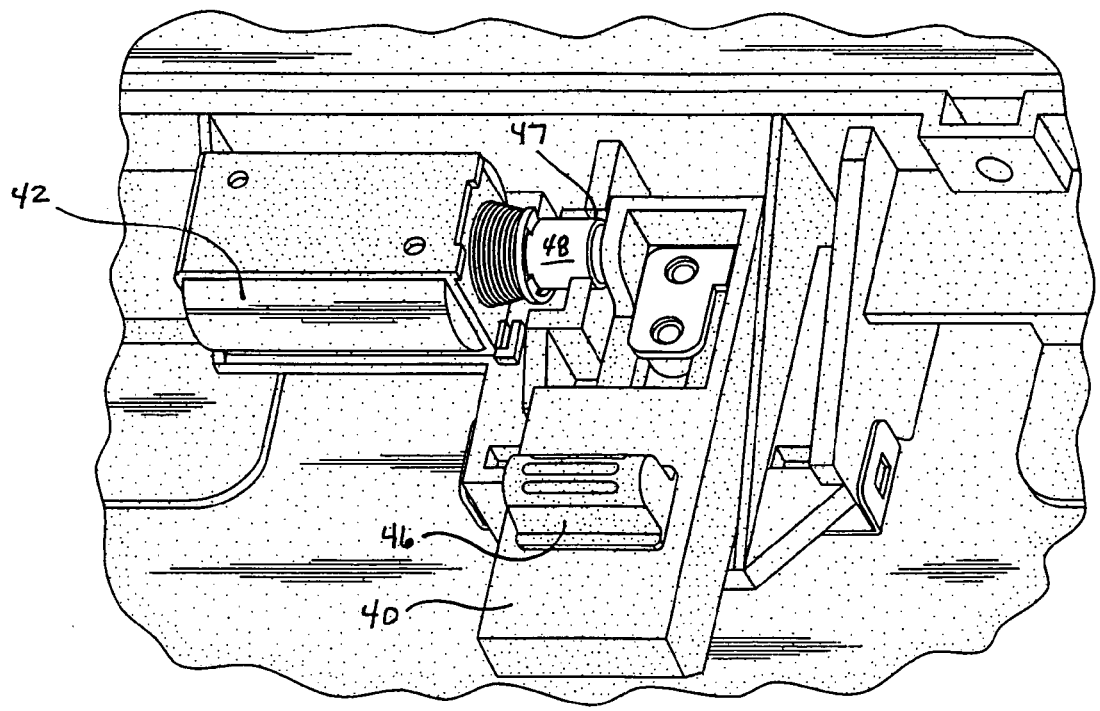
FIG. 7b is a partial side view of the docking station depicting a locking mechanism in an unlocked position.

FIGS. 7a and 7b depict the solenoid valve 42 having a moveable stem 48 that moves toward and away from the body of the solenoid valve 42. As shown, the movable stem 48 is configured to insert with and cooperate with the notch 47 of the slide member 40 to define a lock position of the portable multimedia unit 12. Moreover, the movable stem 48 is configured to withdraw away from the notch 47 to define an unlocked position of the portable multimedia unit 12. The solenoid valve 42 is in electrical communication with the microprocessor 36. As described in greater detail below, if there is support sensed on the portable multimedia unit 12, then the microprocessor 36 activates the movable stem 48 of the solenoid valve 42 in the unlock position to enable the slide member 40 to slide away from the portable multimedia unit 12, thereby allowing for release of the portable multimedia unit 12 from the system. The solenoid valve 42 may be any suitable solenoid valve 42 known in the art capable of activating the unlock position of the slide member 40.

In this embodiment, the microprocessor 36 is attached to the main frame 14. Preferably, the microprocessor 36 is configured to control the solenoid valve 42 based on voltage signals received from the support sensor. The microprocessor 36 may also include additional features to insure safe and cost effective use of the multimedia system 10.

Figure 8A:
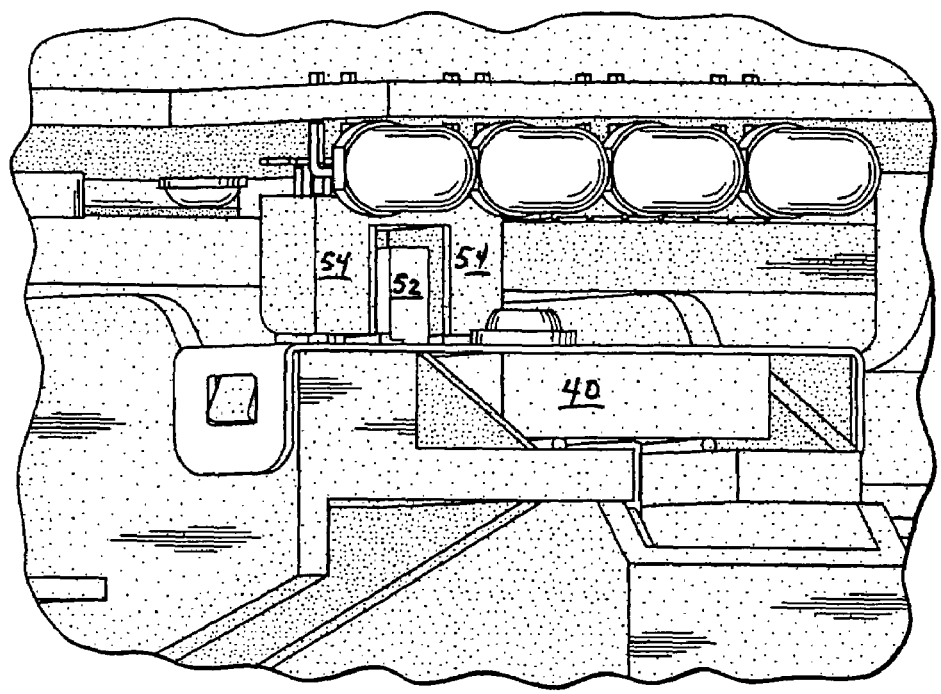
FIG. 8a is another partial side view of the docking station depicting an optical sensor in the locked position.
Figure 8B:
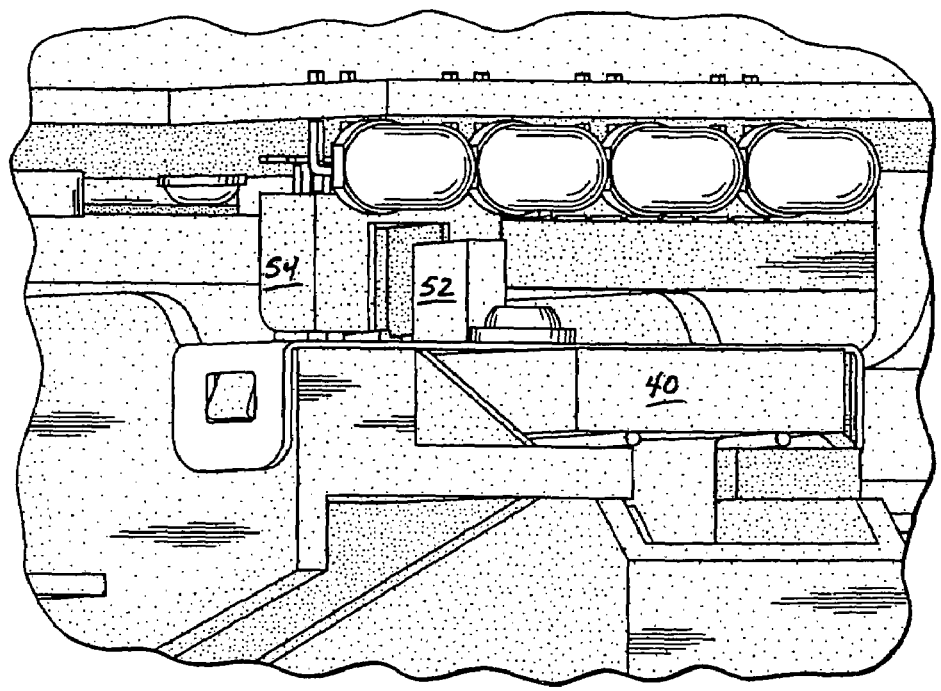
FIG. 8b is a partial side view of the docking station depicting the optical sensor in the unlocked position.

For example, as shown in FIGS. 8a, 8b, and 9 the microprocessor 36 may be configured to implement an actual aligned physical connection or a power aligned connection between the portable multimedia unit 12 and the docking station 13. FIGS. 8a and 8b illustrate an optical flag 52 disposed on the slide member 40 and an optical sensor 54 disposed on the main frame 14 and in electrical communication with the microprocessor 36. As shown in FIG. 8a, if the optical flag 52 is not in physical alignment with the optical sensor 54 (i.e., the portable multimedia unit 12 is not docked or docked incorrectly on the multimedia system 10), then power supply to the multimedia system 10 is cut. As shown in FIG. 8b, if the optical flag 52 is in alignment with the optical sensor 54 (i.e., when the portable multimedia unit 12 is properly docked on the docking station 13), then the power supply is provided to the multimedia system 10. This feature ensures safe use of the multimedia system 10.

Moreover, the microprocessor 36 may be configured to assess the power supply or power level of the vehicle battery or a reserve battery. Based on a predetermined threshold, the microprocessor 36 may be configured to power-down the system or allow use. Additionally, the microprocessor 36 may be configured to remain in the locked position when the vehicle is powered off. The microprocessor 36 may be configured to sound an alarm, if the multimedia system 10 is removed contrary to rules set forth in the microprocessor 36. Furthermore, microprocessor 36 may include an IR or a RF transmitter and an IR/RF receiver to facilitate remote access and control capabilities via remote controls, wireless headphones, and speakers.

FIG. 9 illustrates a block diagram 110 for the safety interlock feature of the multimedia system 10 in accordance with one embodiment of the present invention. As shown, the microprocessor 36 is configured to activate the unlock position, when the support sensor senses that a support threshold is obtained on the portable multimedia unit 12. For example, when about 3 psig is sensed by the support sensor, the microprocessor 36 activates the solenoid valve 42 in the unlock position, thereby enabling the portable multimedia unit 12 to be removed from the docking station 13. Moreover, when the portable multimedia unit 12 is adequately docked on the docking station 13, i.e., the microprocessor 36 senses alignment between the optical flag 52 and the optical sensor 54, power supply is provided to the multimedia system 10 so long as other parameters (mentioned above) are determined.

Referring to FIG. 10, the present invention provides a method 210 of interlocking a portable multimedia unit 12 to a docking station 13 in a vehicle. As shown, the method 210 comprises sensing in box 212 parameter indicative of support on the portable multimedia unit 12. As mentioned above, as the portable multimedia unit 12 is docked in the docking station 13, a user may place pressure on the docked unit. If a predetermined threshold is obtained, then a voltage signal, e.g., 3.3v, indicative of the obtained threshold is sent to the microprocessor 36.

The method 210 further includes switching in box 214 the portable multimedia unit 12 to an unlocked position from a locked position in the docking station 13. In this example, this may be accomplished by activating the solenoid valve 42 to the unlocked position. The unlocked position enables the portable multimedia unit 12 to be removed from the docking station 13 if so desired and if the predetermined threshold is obtained. The method 210 further includes sliding the slide member 40 to disengage from the portable multimedia unit 12 and releasing in box 216 the portable multimedia unit 12 from the docking station 13.

As mentioned above, the method 210 may further comprise sensing alignment of the portable multimedia unit 12 with the docking station 13. This may be accomplished by the optical flag 52 disposed on the slide member 40 and the optical sensor 54 in electrical communication with the microprocessor 36 as described above. The method 210 may further include supplying power to the multimedia system 10, if the portable multimedia unit 12 is in alignment with the docking station 13.

As mentioned above, the microprocessor 36 may be configured to determine the vehicle status, e.g., whether the vehicle is mobile or whether the vehicle is powered on. The method 210 may include switching the portable multimedia unit 12 to the unlocked position, if the vehicle is immobile and is powered on.

As mentioned above, the microprocessor 36 may further be configured to determine the status of the vehicle and the multimedia system 10, and activate an alarm, if the portable multimedia unit 12 is removed from the docking station 13 when the vehicle is powered off.

While the present invention has been described in terms of preferred embodiments, it will be understood, of course, that the invention is not limited thereto since modifications may be made to those skilled in the art, particularly in light of the foregoing teachings.

The invention claimed is:

1. A vehicle multimedia system having a safety interlock mechanism, the system comprising:
    a portable multimedia unit having a support sensor for sensing support thereon; and
    a docking station configured to interlock the portable multimedia unit therein, the docking station comprising a main frame having a receiving port to receive the portable multimedia unit, the main frame including a locking assembly for securing the portable multimedia unit to the main frame and a microprocessor for communicating with the locking assembly and the support sensor.

2. The system of claim 1 wherein the support sensor is a pressure sensor configured to sense support pressure on the portable multimedia unit when the portable multimedia unit is docked in docking station.

3. The system of claim 2 wherein the support pressure is between about 2 and 4 pounds per square inch.

4. The system of claim 1 further comprising a moveable floor pivotally connected to the docking station at the receiving port, the moveable floor being spring loaded to the main frame for receiving the portable multimedia unit; and
    a cover attached to the docking station to cover the main frame.

5. The system of claim 1 wherein the locking assembly includes:
    a slide member slidably attached to the main frame, the slide member having a latching end cooperable with the portable multimedia unit to lock the portable multimedia unit to the docking station, the slide member having a button end for sliding the slide member relative to the main frame, the slide member having a notch formed therealong; and
    a solenoid valve having a movable stem cooperable with the notch of the slide member to define a lock position and an unlock position of the portable multimedia unit, the solenoid valve being an electrical communication with the microprocessor to move the stem based on the support sensed by the support sensor.

6. The system of claim 1 wherein the microprocessor is disposed on a printed circuit board.

7. The system of claim 6 wherein the printed circuit board includes an infrared transmitter and an infrared receiver for remote access and control.

8. The system of claim 1 wherein the portable multimedia unit is a digital video disk unit.

9. A vehicle multimedia system having a safety interlock mechanism, the system comprising:
    a portable multimedia unit having a support sensor for sensing support thereon;
    a docking station configured to interlock the portable multimedia unit therein, the docking station comprising a main frame having a receiving port to receive the portable multimedia unit, the main frame including a locking assembly for securing the portable multimedia unit to the main frame and a microprocessor for communicating with the locking assembly and the support sensor;

a slide member slidably attached to the main frame, the slide member having a latching end cooperable with the portable multimedia unit to lock the portable multimedia unit to the docking station, the slide member having a button end for sliding the slide member relative to the main frame, the slide member having a notch formed therealong; and a solenoid valve having a movable stem cooperable with the notch of the slide member to define a lock position and an unlock position of the portable multimedia unit, the solenoid valve being an electrical communication with the microprocessor to move the stem based on the support sensed by the support sensor.

10. The system of claim 9 wherein the support sensor is a pressure sensor configured to sense support pressure on the portable multimedia unit when the portable multimedia unit is docked in docking station.

11. The system of claim 10 wherein the support pressure is between about 2 and 4 pounds per square inch.

12. The system of claim 9 wherein the microprocessor is a printed circuit board.

13. The system of claim 12 wherein the printed circuit board includes an infrared transmitter and an infrared receiver for remote access and control.

14. The system of claim 9 wherein the portable multimedia unit is a digital video disk unit.

15. A method of interlocking a portable multimedia unit to a docking station in a vehicle, the method comprising:

sensing a parameter indicative of support on the portable multimedia unit;

switching the portable multimedia unit to an unlocked position from a locked position in the docking station so that the portable multimedia unit can be removed from the docking station, if the parameter indicative of support reaches a predetermined threshold; and releasing the portable multimedia unit from the docking station.

16. The method of claim 15 wherein the parameter indicative of support is pressure on the portable multimedia unit.

17. The method of claim 15 wherein the predetermined threshold is 30 pounds per square inch gauge.

18. The method of claim 15 further comprising:

providing the portable multimedia unit docked within the docking station;

sensing alignment of the portable multimedia unit with the docking station; and supplying power to the multimedia system, if the portable multimedia unit is in alignment with the docking station.

19. The method of claim 15 wherein the step of switching includes:

determining whether the vehicle status;

switching the portable multimedia unit to the unlocked position, if the vehicle is immobile and is powered on.

20. The method of claim 15 further comprising:

determining the status of the vehicle and the multimedia system;

activating an alarm, if the portable multimedia unit is removed from the docking station when the vehicle is powered off.

* * * * *